(12) United States Patent
Hamrell et al.

(10) Patent No.: US 9,327,798 B1
(45) Date of Patent: May 3, 2016

(54) DRIVE SYSTEM FOR VEHICLES

(76) Inventors: Matthew J. Hamrell, Burlington, VT (US); Glenn David Ross, Marietta, GA (US)

( * ) Notice: Subject to any disclaimer, the term of this patent is extended or adjusted under 35 U.S.C. 154(b) by 415 days.

(21) Appl. No.: 13/523,700

(22) Filed: Jun. 14, 2012

Related U.S. Application Data

(60) Provisional application No. 61/520,783, filed on Jun. 15, 2011.

(51) Int. Cl.
*B60K 17/34* (2006.01)
*B62M 1/30* (2013.01)
*B60K 23/08* (2006.01)

(52) U.S. Cl.
CPC .............. *B62M 1/30* (2013.01); *B60K 23/0808* (2013.01)

(58) Field of Classification Search
CPC .............................. B62M 1/30; B60K 23/0808
USPC .................................... 180/233; 280/253–260
See application file for complete search history.

(56) References Cited

U.S. PATENT DOCUMENTS

| | | | | |
|---|---|---|---|---|
| 2,707,112 A * | 4/1955 | Ludwigson et al. | .......... | 280/221 |
| 3,905,457 A * | 9/1975 | Shea | .............................. | 475/204 |
| 4,052,912 A * | 10/1977 | Vukelic | ............................. | 74/512 |
| 4,826,190 A * | 5/1989 | Hartmann | ...................... | 280/236 |
| 5,511,809 A * | 4/1996 | Sagi | ............................... | 280/209 |
| 6,312,001 B1 * | 11/2001 | Boyer | .......................... | 280/282 |
| 7,032,914 B2 * | 4/2006 | Miller | .......................... | 280/260 |
| 7,255,194 B2 * | 8/2007 | Lim et al. | ...................... | 180/411 |
| 7,458,911 B2 * | 12/2008 | Krisher et al. | .................. | 475/86 |
| 8,096,567 B2 * | 1/2012 | Cordier | .................. | 280/124.109 |
| 8,272,655 B2 * | 9/2012 | Kim | ................................ | 280/221 |
| 2004/0104056 A1 * | 6/2004 | Perlick et al. | .................. | 180/6.2 |
| 2004/0163856 A1 * | 8/2004 | Kroppe | .......................... | 180/6.2 |
| 2010/0161190 A1 * | 6/2010 | McCann et al. | ................ | 701/69 |
| 2010/0295264 A1 * | 11/2010 | Denais | .......................... | 280/260 |
| 2014/0070514 A1 * | 3/2014 | Dai | ................................ | 280/210 |

* cited by examiner

*Primary Examiner* — Joseph Rocca
*Assistant Examiner* — Marlon Arce
(74) *Attorney, Agent, or Firm* — Thomas G. Ference

(57) ABSTRACT

The present application is directed to a drive system. The drive system comprises a drive shaft and a driven wheel assembly. The wheel assembly includes a split axle coupled perpendicular to the drive shaft. An overrunning clutch is coupled between each section of the split axle and the drive shaft. A wheel is coupled to spin with each axle section. The wheels receive power from the drive shaft and are driven so that when power is applied from the drive shaft to the driven wheel assembly, whichever wheel that is spinning the slowest receives the power. The drive system may be incorporated into any number of vehicles to improve traction around turns, improve wheel slippage on uneven terrain and generates new options for how and where vehicles may be ridden.

23 Claims, 8 Drawing Sheets

DRIVE SYSTEM FOR VEHICLES

RELATED APPLICATIONS

This application claims the benefit of priority of U.S. Provisional Patent Application No. 61/520,783, filed Jun. 15, 2011 entitled "Drive System for Vehicles", which is incorporated herein by reference.

FIELD

This patent application generally relates to a drive system for vehicles. More specifically it relates to a drive system including a split axle, each section of the split axle coupled to a single drive shaft by overrunning clutches.

BACKGROUND

Two, three and four wheeled vehicles have been around for hundreds of years. Various types of drive systems have been developed to help facilitate their movement. Traditional bicycles have a back, powered wheel on a single axle and a front non-powered wheel on a single axle. If the back wheel loses traction, the bicycle may slow down and even stop. Adding a second wheel to an axle can increase both traction and stability for a vehicle. However, when going around turns the inner and outer wheels follow paths of different lengths and need to spin at different rates. The wheel on the outer part of the turn travels further and therefore needs to spin faster to keep up with the wheel on the inner part of the turn. This difference in spin rates can create traction problems for the vehicle when going around turns. The current patent application provides a new type of drive system for vehicles that improves traction around turns, improves wheel slippage on uneven terrain and generates new options for how and where vehicles can be ridden.

SUMMARY

One aspect of the present patent application is directed to a drive system. The drive system comprises a drive shaft and a driven wheel assembly. The driven wheel assembly includes a split axle coupled perpendicular to the drive shaft. The split axle has two axle sections. An overrunning clutch is coupled between each axle section and the drive shaft. A wheel is coupled to spin with each axle section. The wheels receive power from the drive shaft and are driven so that when power is applied from the drive shaft to the driven wheel assembly, whichever wheel that is spinning the slowest receives the power.

Another aspect of the present application is directed to vehicle. The vehicle comprises a frame assembly with a steering assembly. The frame assembly defines a front end, rear end and lean plane for the vehicle. The vehicle further comprises a front wheel assembly coupled to the front end and a drive shaft assembly mounted to the frame assembly. The drive shaft assembly has a drive shaft lying along the lean plane. A rear driven wheel assembly is coupled to the rear end. The rear driven wheel assembly has a rear split axle including two rear axle sections that are coupled perpendicular to the drive shaft, an overrunning clutch coupled between each rear axle section and the drive shaft, a rear wheel coupled to spin with each rear axle section, the rear wheels receiving power from the drive shaft assembly through the drive shaft. When power is applied from the drive shaft to the rear driven wheel assembly, whichever rear wheel is spinning the slowest receives the power.

Still another aspect of the present application is directed to a kit for converting a bike with front and rear wheel dropouts into a four-wheel vehicle. The kit comprises a front wheel assembly including a front wheel dropout connector. The kit further comprises a rear driven wheel assembly. The rear driven wheel assembly includes i) a rear wheel dropout connector, ii) a drive shaft assembly mounted to the dropout connector and operable to receive power from the bike, and iii) the rear driven wheel assembly has a rear split axle including two rear axle sections that are coupled perpendicular to the drive shaft, an overrunning clutch coupled between each rear axle section and the drive shaft, a rear wheel coupled to spin with each rear axle section, the rear wheels operable to receive power from the drive shaft assembly through the drive shaft. When power is applied from the drive shaft to the rear driven wheel assembly, whichever rear wheel that is spinning the slowest receives the power.

BRIEF DESCRIPTION OF DRAWINGS

The foregoing and other aspects and advantages presented in this patent application will be apparent from the following detailed description, as illustrated in the accompanying drawings, in which.

DETAILED DESCRIPTION

Drive system 18 is shown in FIGS. 1-8*c*. For illustrative purposes drive system 18 is shown integrated to form one possible variation of a vehicle 20 where the vehicle has four wheels and other specific elements. However, it is understood that drive system 18 could be integrated to drive a wide variety of other vehicles that incorporate alternative elements.

The variations of elements that may be associated with vehicle 20 will be presented throughout this patent application.

Figure 1:
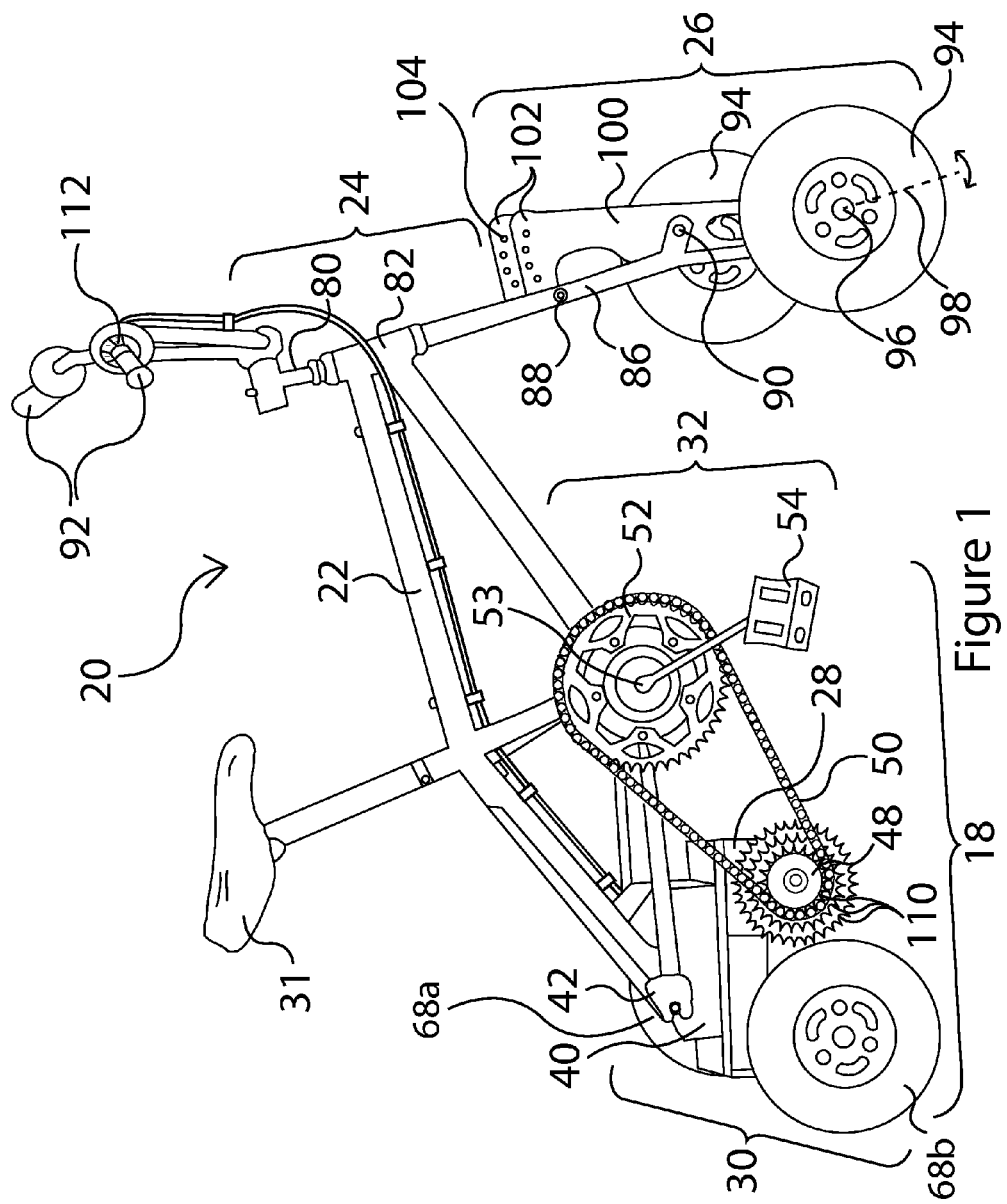
FIG. 1 is a perspective view of one embodiment of a vehicle incorporating the drive system according to the present patent application.
Figure 2:
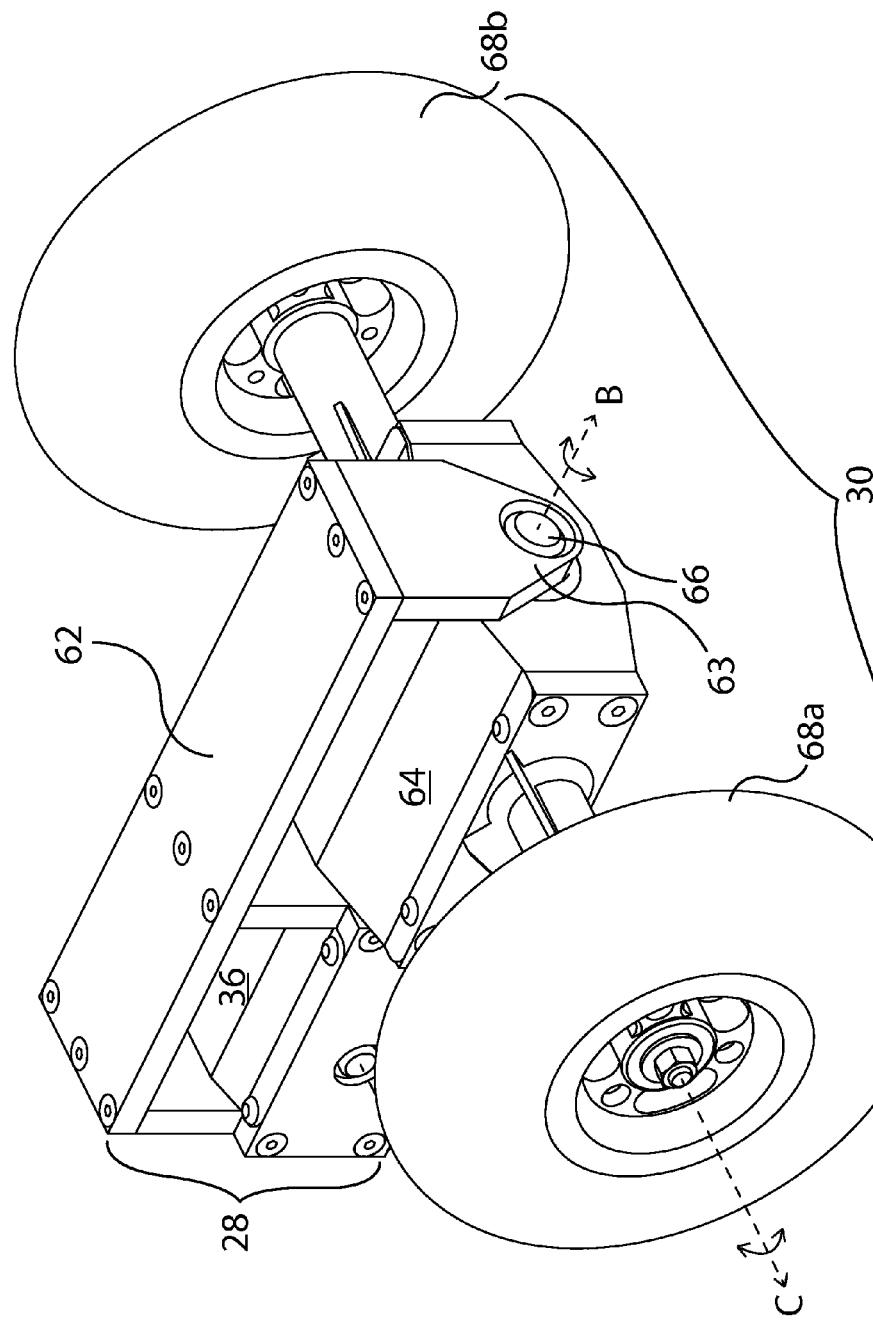
FIG. 2 is a perspective view of the drive shaft assembly integrated with the rear driven wheel assembly for the vehicle illustrated in FIG. 1.
Figure 3:
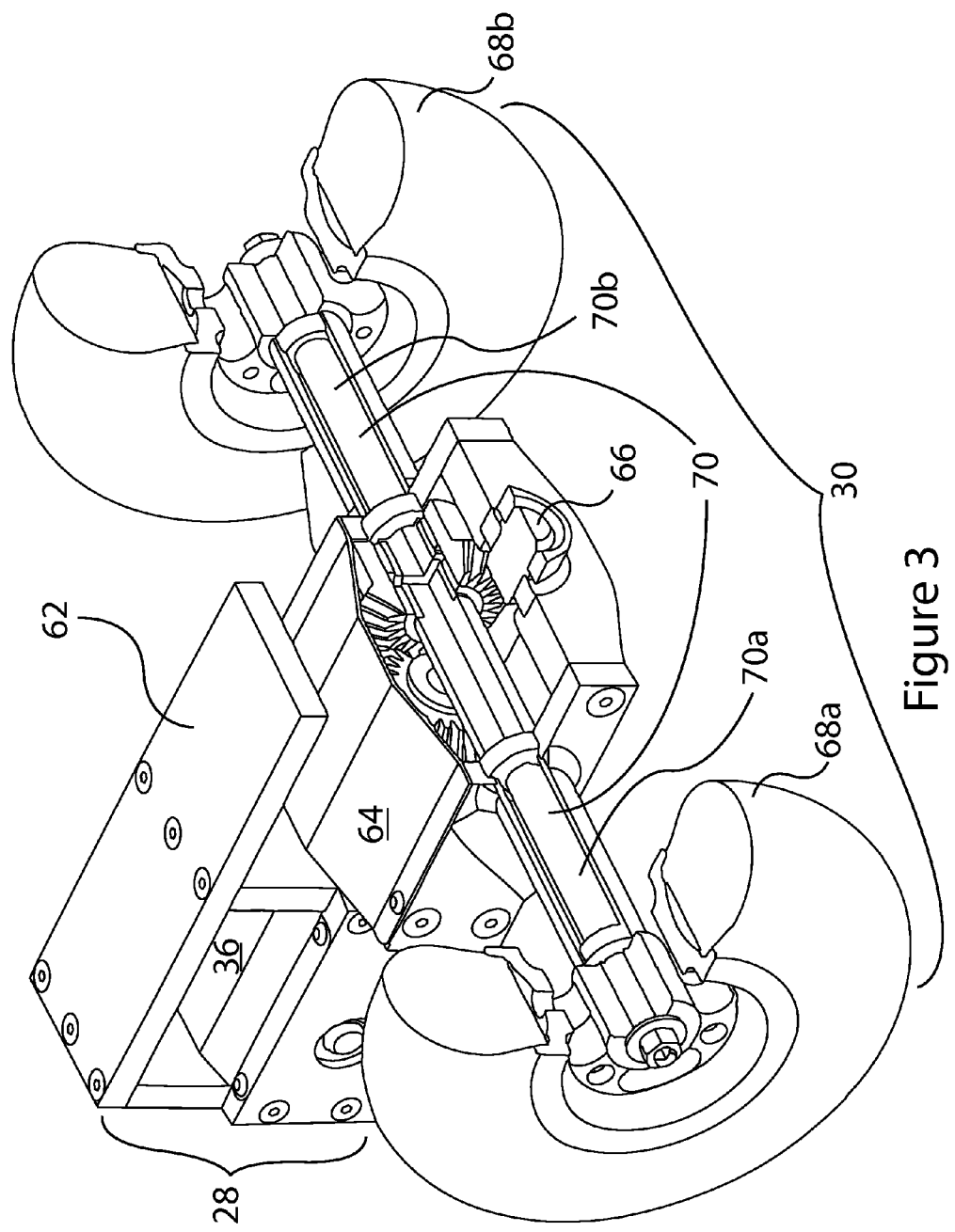
FIG. 3 is a partial cut away, perspective view of the drive shaft assembly integrated with the rear driven wheel assembly for the vehicle illustrated in FIG. 1.

One embodiment of vehicle 20, as shown in FIG. 1, comprises a frame assembly 22 and a steering assembly 24. Frame assembly 22 defines a front end, a rear end and lean plane 25 for vehicle 20. Vehicle 20 additionally comprises a front wheel assembly 26 coupled to the front end of frame assembly 22. Vehicle 20 also comprises drive system 18 mounted to frame assembly 22. Drive system 18 comprises drive shaft assembly 28, driven wheel assembly 30 and power assembly 32. For the particular embodiment of vehicle 20 shown in FIG. 1, driven wheel assembly 30 is a rear driven wheel assembly and coupled to the back end of vehicle 20. In other embodiments, the driven wheel assembly 30 may be located at other positions along frame assembly 22. Wheels 68a and 68b are engaged to receive power from drive shaft assembly 28. Power is generated by power assembly 32 and this input power transferred to drive shaft assembly 28. Seat 31 may or may not be included as a component of vehicle 20 depending on how the vehicle is intended to be used.

Drive shaft assembly 28 and driven wheel assembly 30 are integrally connected as shown in FIGS. 1-4. The individual components of which are shown in FIG. 5. Drive shaft assembly 28 includes a drive shaft 34 lying along lean plane 25 of frame assembly 22. Drive shaft 34 lies alone drive axis (axis B). Drive shaft 34 resides at least partially within drive case 36. Drive case 36 may be constructed from several drive case plates or other alternative support structures. Drive shaft 34 is supported by two bearings 38c and 38d. Drive case 36 is anchored to frame assembly 22 by drive case mounting plate 40 that has two extensions from the drive case and interlocks with rear wheel dropouts 42 of the frame assembly. Although mounting plate 40 is a convenient way to mount drive case 36 to a standard bike frame, a wide range of other structures exist to mount the drive case to frame assembly 22. For example, drive case 36 could be constructed as an integral part of frame assembly 22 instead of an attachment.

A variety of power assemblies 32 can be used to rotate drive shaft 34. For example, a conventional pedal and chain power assembly 32 may be used as shown in FIG. 1. Similarly, drive shaft 34 may be directly rotated by a motor. Further, pedals or a motor may be combined with a belt to form a power assembly. Still further, drive shaft assembly 28 may be directly driven by power assembly 32, the power assembly including only peddles, a power shaft and with or without gears or sprockets. It is therefore possible to have a variety of power transmission components coupled to transfer input power from a variety of power assemblies 32 to drive shaft 34.

Figure 4:
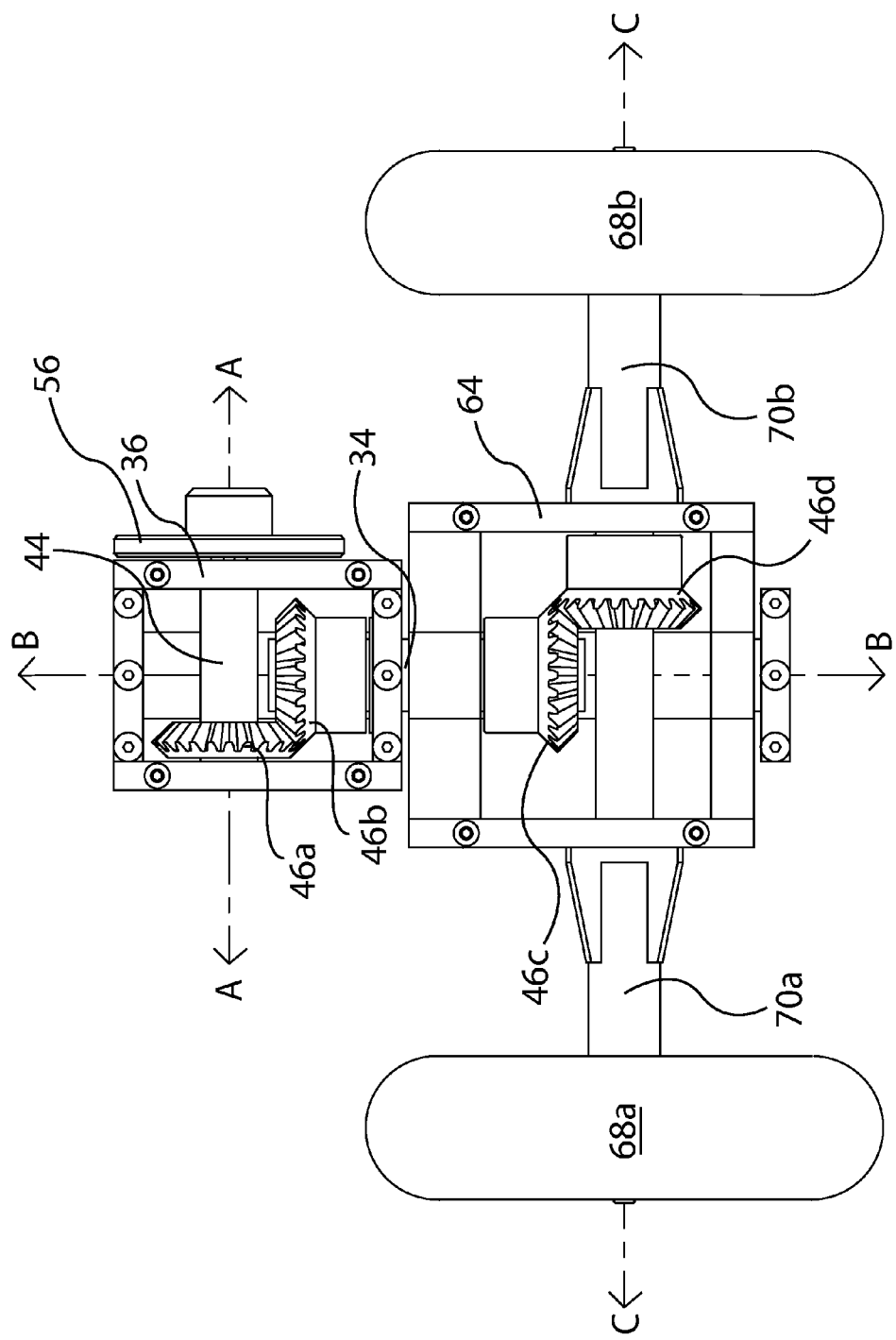
FIG. 4 is a partial cut away, topside view of the drive shaft assembly integrated with the rear driven wheel assembly for the vehicle illustrated in FIG. 1.
Figure 5:
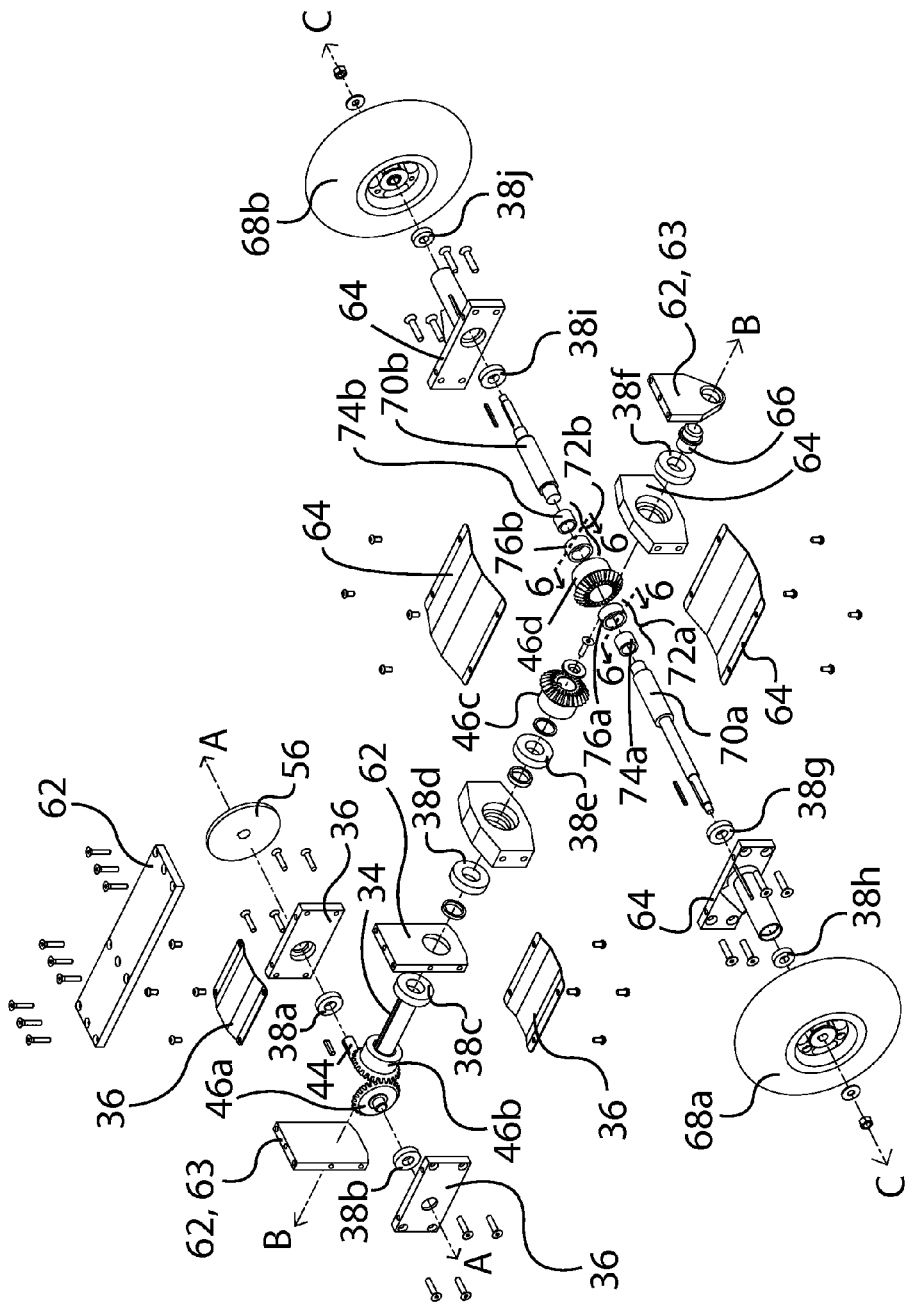
FIG. 5 is an exploded view of the drive shaft assembly integrated with the rear driven wheel assembly for the vehicle illustrated in FIG. 1.

In the case of the conventional pedal and chain power assembly 32, a power input shaft 44 is further coupled at a right angle to drive shaft 34 by a set of bevel gears 46a and 46b, FIG. 4. Input shaft 44 is journaled through the wall of drive case 36 and supported by two bearings 38a and 38b. The end of input shaft 44 that extends outside drive case 36 is coupled to a driven sprocket 48 having teeth that engage a drive chain 50. Drive chain 50 wraps around pedal sprocket 52, which also has teeth that engage the chain. Drive chain 50 provides a continuous loop around pedal sprocket 52 and driven sprocket 48. Pedal sprocket 52 is mounted to a pedal shaft 53 journaled through frame assembly 22. Pedals 54 extend from the pedal shaft. Operation of the pedal and chain power assembly 32 is such that when a force is applied to pedals 54, the force will cause drive chain 50 to rotate input shaft 44 around axis A, which then rotates drive shaft 34. In one embodiment, FIGS. 4 and 5, a power input overrunning clutch 56 is provided between driven sprocket 48 and input shaft 44 to allow for power to be applied in one direction to the input shaft. The power input overrunning clutch 56 is not necessary in other embodiments. Power input overrunning clutch 56 includes an inner race, an outer race and roller elements. Driven sprocket 48 is mounted to outer race and inner race is mounted to input shaft 44.

Coupling of drive shaft assembly 28 to driven wheel assembly 30 occurs along drive shaft 34. Drive case 36 has a U-shaped element 62 having u-ends 63 that extends from the rear end of the drive case. U-shaped element 62 provides support to that portion of drive shaft 34 that resides outside the drive case and passes through wheel case 64. Drive shaft 34 is supported by a bearing 38e where the drive shaft exits the rear of drive case 36. U-shaped element 62 also provides support to the rear end of wheel case 64 by support shaft 66 and bearing 38f.

Wheel case 64 pivots around drive shaft 34 and support shaft 66 along axis B, within U-shaped element 62. Support shaft 66 is located inline and concentric to drive shaft 34. Wheel case 64 contains those elements that control how power is distributed to each of the wheels 68a and 68b. For the particular embodiment of the vehicle in FIG. 1, the wheels 68a and 68b are rear wheels, but it is understood that the rear wheels could be driven wheels associated with different vehicles and not necessarily in the rear position relative to those specific different vehicle configurations. Wheel case 64 is constructed from several wheel case plates or other structure sufficient to support the associated components such as a casting or a welded frame structure. The rear end of drive shaft 34 is supported by bearing 38e where the drive shaft enters the front end of wheel case 64. Drive shaft 34 is terminated with a bevel gear 46c. Bevel gear 46c engages at a right angle another bevel gear 46d. Bevel gear 46d is integrated with the two sections of a split axle 70. Bevel gear 46d is positioned such that the bevel gear can engage the two sections of the split axle 70. Axle sections 70a and 70b are coupled to bevel gear 46d by two overrunning clutches 72a and 72b.

Figure 6:
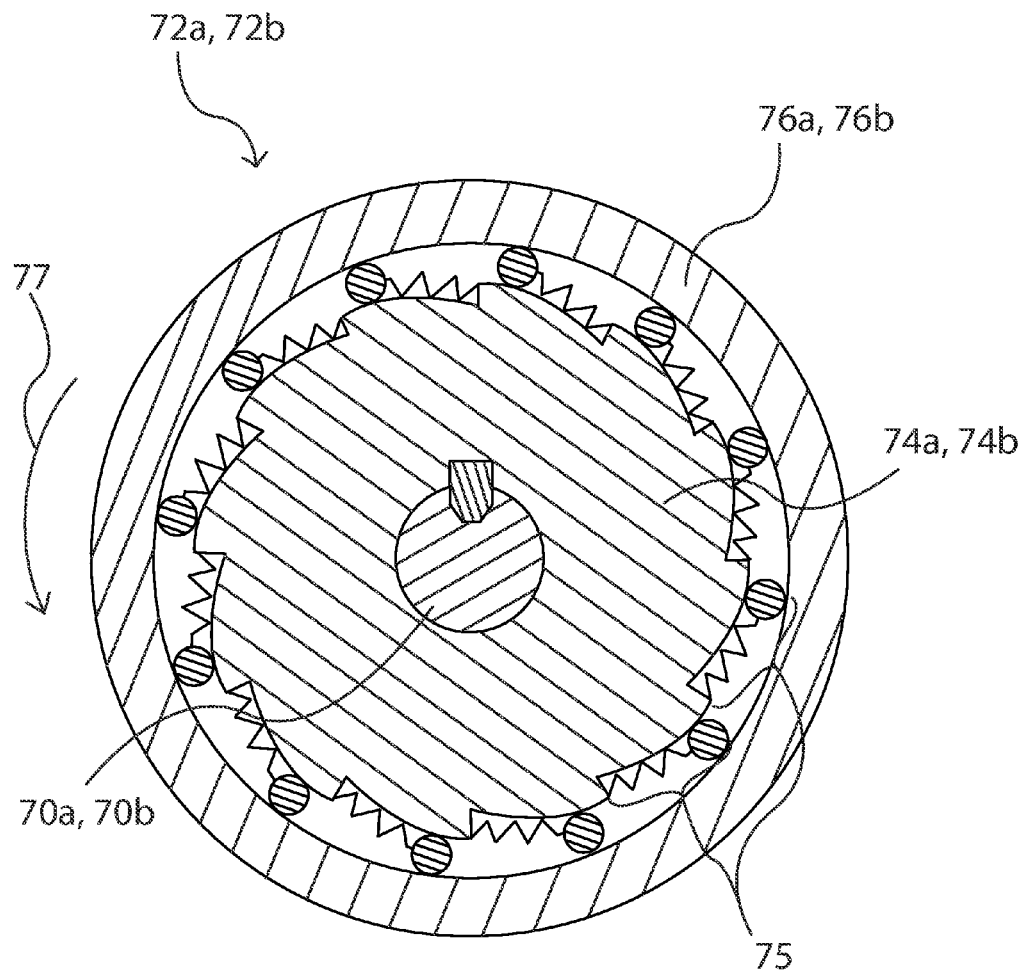
FIG. 6 is a sectional, schematic view of an overrunning clutch along lines 6-6 in FIG. 5, but in the unexploded configuration.
Figure 7:
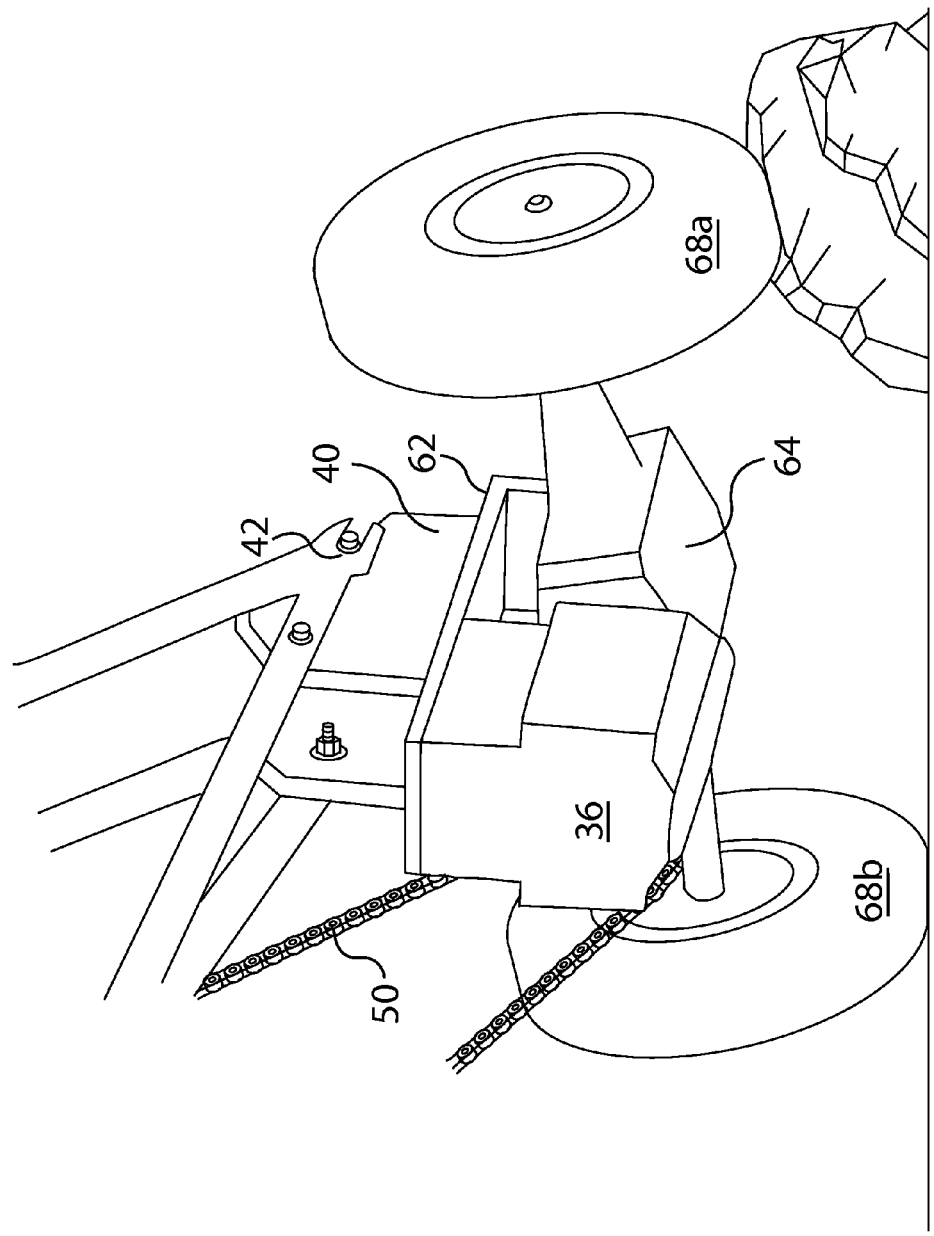
FIG. 7 is a perspective view of the drive shaft assembly integrated with the rear driven wheel assembly for the vehicle illustrated in FIG. 1 when the rear driven wheel assembly moves over uneven terrain.
Figure 8A:
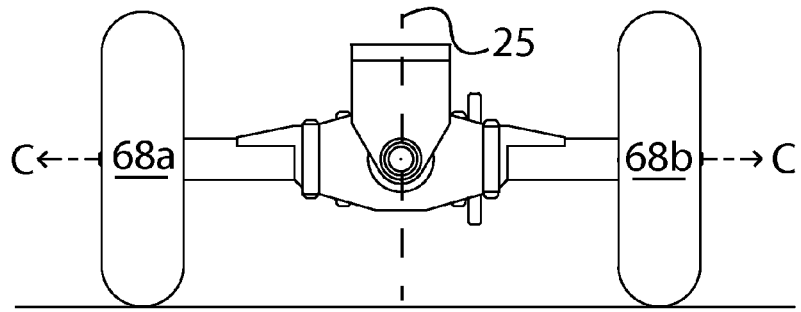
FIG. 8*a* is a rear view of the drive shaft assembly integrated with the rear driven wheel assembly for the vehicle illustrated in FIG. 1 when the rear driven wheel assembly moves over flat terrain.
Figure 8B:
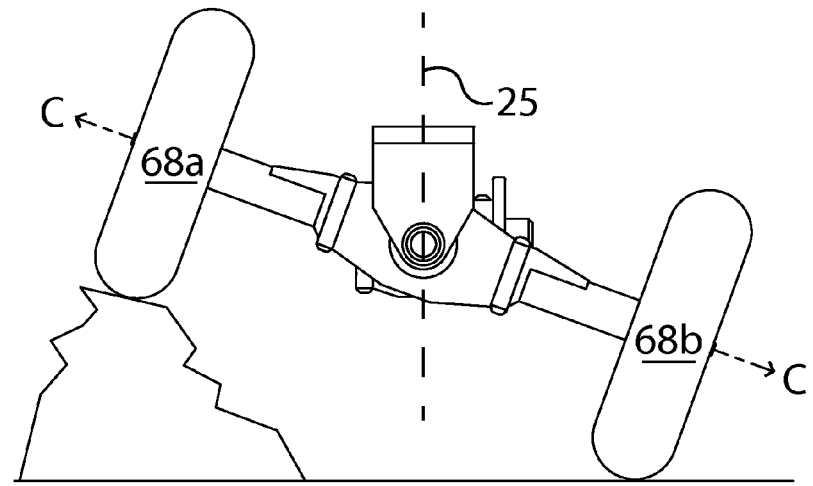
FIG. 8*b* is a rear view of the drive shaft assembly integrated with the rear driven wheel assembly for the vehicle illustrated in FIG. 1 when the rear driven wheel assembly moves over uneven terrain.
Figure 8C:
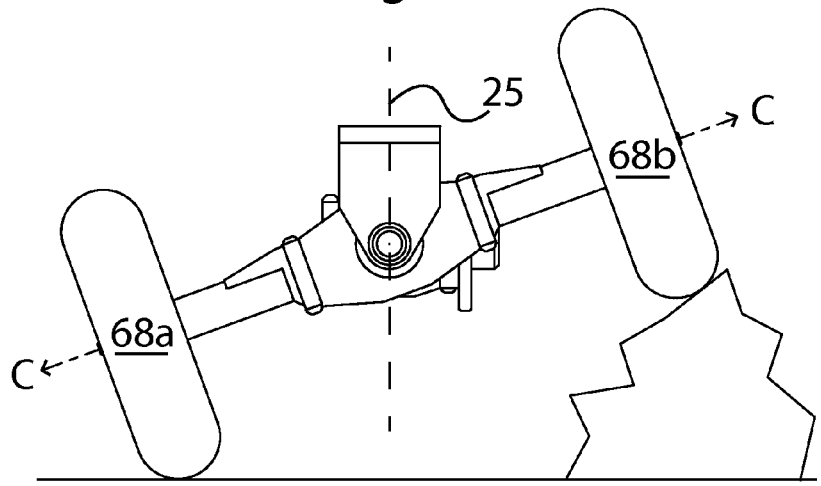
FIG. 8*c* is a rear view of the drive shaft assembly integrated with the rear driven wheel assembly for the vehicle illustrated in FIG. 1 when the rear driven wheel assembly moves over uneven terrain.

Overrunning clutch 72a and 72b, schematically illustrated in FIG. 6, may be any one from the group including a roller clutch, a sprag clutch, a freewheel clutch or ratchet mechanism. Overrunning clutch 72a is made up of an inner race 74a and an outer race 76a. Overrunning clutch 72b is made up of an inner race 74b and an outer race 76b. Roller elements 75 are contained between inner race 74a and outer race 76a and also between inner race 74b and outer race 76b. Roller elements 75 may be cylinders, cylinders with bias elements, pawls, etc. Cylinders may have a circular or elliptical cross-section. Roller elements 75 engage their respective inner race in the drive direction to impart power to the inner race, but the roller elements disengage to allow the inner race to turn freely when it is turning faster than the outer races. Axle section 70a is mounted to inner race 74a. Axle section 70b is mounted to inner race 74b. Axle section 70a is supported by two bearings 38g and 38h as it passes through a first side of wheel case 64. Axle sections 70a and 70b divide the applied force between wheels 68a and 68b. Overrunning clutches 72a and 72b determine which wheel 68a or 68b the force is applied to. Wheel 68a is concentrically mounted to axle section 70a. Axle section 70b is also supported by two bearings, 38i and 38j, as the axle section passes through the opposite side of case 64. Wheel 68b is concentrically mounted to rear axle section 70b. Wheels 68a and 68b rotate around axis C.

Over running clutches 72a and 72b are structured so that the outer race has a direction of engagement 77 with inner race, FIG. 6. The two overrunning clutches are mounted to spin along an axis with their direction of engagement in the same direction around that axis. However, because the overrunning clutches are mounted to two separate sections of a split axle 70, each associated wheel may spin independently of the other wheel. For each wheel if the outer race turns in the direction of engagement, the inner race turns with the outer race as long as the inner race is not already turning faster than the outer race. If the inner race is turning faster than the outer race, then the inner race continues to turn freely. If the outer race turns opposite the direction of engagement, the inner race turns freely and independent of the rotation of the outer race. The inner race may also turn freely in the driven direction if the outer race is not turning at all. This feature of the overrunning clutches working together with the drive shaft and the rear wheels is key to the improved operation of vehicle 20. The two overrunning clutches 72a and 72b allow for the varying speed of the two wheels 68a and 68b when making turns with vehicle 20. This allows the outside wheel (wheel following longer arc of a turn) to freely rotate at a faster rate than the inside wheel (wheel following shorter arc of a turn) when vehicle 20 is moving through a turn, while still maintaining a driving force on the inside wheel. This same concept also applies for the varying speed of the two wheels 68a and 68b when one is going over uneven terrain. For example, if one of the wheels needs to go up and over something, that wheel will have a longer travel path. Overrunning clutches 72a and 72b allow the wheel taking the longer path to freely rotate at a faster rate than the wheel taking the shorter path, but still maintain a driving force on the wheel taking the shorter path. Furthermore, on terrain with differing levels of traction (e.g., ice or mud), power is delivered to the wheel with the most traction. This is because a wheel with no friction will spin freely as the overrunning clutch is disengaged and the wheel with friction will have that overrunning clutch engage. Since there are two wheels in the rear wheel assembly, the traction capability is double that of a two-wheeled bike where only a single back-powered wheel exists and if that single powered wheel slips there is no traction.

For the particular embodiment of vehicle 20 shown in FIG. 1, by having drive shaft 34 supported on bearings (38c, 38d, 38e, 38f), frame assembly 22 with associated lean plane 25 is free to rotate in either direction relative to the ground around lean axis (axis B) and have axle sections 70a and 70b still apply a rotational force to drive either or both of wheels 68a and 68b. Lean axis and drive axis are co-linear, they both coincide with axis B. This allows the rider to shift their body weight along with the lean plane to compensate for centripetal forces when going around turns. Also, by having the wheels tilt independently of the lean plane, more direct contact of the wheels occurs with any uneven terrain allowing more traction, a smoother ride and a more controlled ride. This feature is demonstrated in FIGS. 7-8c that show wheels 68a and 68b riding over uneven terrain while keeping lean plane 25 and the rider in an optimum position for riding. However, it is also possible to have drive system 18 incorporated with a vehicle so that there is no lean plane and just provide the benefits of the wheels rotating at different speeds for improved handling around turns.

For the embodiment shown in FIG. 1, steering assembly 24 may include the steering elements of a conventional bike, namely a steering shaft 80 journaled within a steering column 82 at the front end of frame assembly 22. The lower end of steering shaft 80 may split into a fork structure 86 where each fork has a brake tab 88 and ends in a front wheel dropout 90. Handlebars 92 extend from the upper end of steering shaft 80. In other embodiments of vehicle 20, a steering wheel may replace the handle bars of steering assembly 24. Also, steering assembly 24 does not have to be split, but may take the form of a single shaft. Furthermore, steering assembly 24 may incorporate a tie rod steering linkage assembly.

Front wheel assembly 26 may include two front wheels 94. Each front wheel 94 may be coupled to spin on a single front axle or coupled to spin on one of two front axle sections. Front axle 96 lies along a front spin axis 98. In the embodiment shown in FIG. 1, front wheel assembly further includes a front wheel mount 100 that extends upward from front axle 96 to engage front wheel dropouts 90 and brake tabs 88. Front axle 96 is mounted to the lower end of front wheel mount 100. Front wheel mount 100 has two locking plates 102 that extend from the upper end. Each locking plate 102 has brake tab holes 104 for mounting to brake tabs 88 and a wheel dropout hole for mounting to wheel dropouts 90. Front wheel mount 100 can be rotated through a range of angles around an axis extending through wheel dropouts 90 and locked in place. The locking mechanism may include bolts, a quick release mechanism or any number of alternative fastening structures. Alternatively, vehicle 20 may deviate from the structure of FIG. 1 and have only one front wheel or no front wheel assembly at all and be ridden similar to a unicycle.

In other embodiments of vehicle 20, front wheel assembly 26 and rear wheel assembly 30 can be fitted with an independent suspension system or truck assemblies to further improve handling and comfort of the vehicle across uneven terrain. In other embodiments, vehicle 20 may have independent steering of each of the front wheels. In other embodiments, multiple gears 110 and a gear shifter 112 may be incorporated with the drive and power assemblies. In yet another embodiment of vehicle 20, front wheel assembly 26 may be replaced with a powered drive system similar to drive system 18 having a split driven wheel assembly including the overrunning clutches and connected to a drive shaft. In this embodiment, vehicle 20 would have four independently powered wheels. In still another embodiment the front wheel assembly, rear driven wheel assembly and drive shaft assembly may be supplied as an attachment for a standard bike. The front wheel assembly would mount to the front wheel dropouts, and the drive shaft assembly coupled with the rear driven wheel assembly would mount to the back wheel dropouts and pedal power assembly of the standard bike. And in still yet another embodiment, frame assembly 22 can be custom designed to take advantage of potential aesthetic, ergonomic and functional advantages of the drive system.

While several embodiments of the invention, together with modifications thereof, have been described in detail herein and illustrated in the accompanying drawings, it will be evident that various further modifications are possible without departing from the scope of the invention. Nothing in the above specification is intended to limit the invention more narrowly than the appended claims. The examples given are intended only to be illustrative rather than exclusive.

What is claimed is:

1. A drive system, comprising:
    a) a drive shaft for receiving power;
    b) a driven wheel assembly including a split axle coupled perpendicular to said drive shaft, said split axle having two axle sections;
    c) an overrunning clutch coupled between each said axle section and said drive shaft, each said overrunning clutch including an outer race and an inner race, said outer race having a direction of engagement with said inner race, said inner race turns with said outer race when said outer race turns in the direction of engagement, said inner race turns freely when said outer race turns opposite the direction of engagement, said inner race turns freely in the direction of engagement as long as the relative rotational speed of said inner race to said outer race is faster than said outer race;

d) a wheel coupled to spin with each said axle section; and e) wherein power from said drive shaft is transferred to whichever wheel spins the slowest.

2. A drive system as recited in claim 1, wherein said inner race turns freely opposite the direction of engagement when said outer race is stationary.

3. A drive system as recited in claim 1, wherein said inner race is driven by said outer race when the relative rotational speed of said inner race is the same as said outer race.

4. A drive system as recited in claim 1, further comprising a power input shaft, said power input shaft at a right angle to said drive shaft and coupled by a set of bevel gears.

5. A drive system as recited in claim 4, further comprising a chain operably engaged with said power input shaft for rotating said power input shaft.

6. A drive system as recited in claim 5, further comprising a peddle shaft having peddles, said peddle shaft operably engaged with said power input shaft, whereby application of force to said peddles causes said peddle shaft to rotate said power input shaft.

7. A drive system as recited in claim 1, further comprising multiple gears and a gear shifter.

8. A drive system as recited in claim 1, further comprising a motor for driving said drive shaft.

9. A drive system as recited in claim 1, further including an axle bevel gear between axle sections, wherein said drive shaft includes a drive bevel gear, wherein said axle bevel gear and drive bevel gear engage at right angles.

10. A vehicle, comprising:

a) a frame assembly having a steering assembly, said frame assembly defining a front end, a rear end and a lean plane;

b) a front wheel assembly coupled to said front end, said front wheel assembly includes a split axle;

c) a drive shaft assembly mounted to said frame assembly, said drive shaft assembly having a drive shaft lying along said lean plane;

d) a rear driven wheel assembly coupled to said rear end, said rear driven wheel assembly having a rear split axle coupled perpendicular to said drive shaft, said rear split axle having two rear axle sections;

e) an overrunning clutch coupled between each rear axle section and said drive shaft, a rear wheel coupled to spin with each rear axle section, each overrunning clutch including an outer race and an inner race, said outer race having a direction of engagement with said inner race, said inner race turns with said outer race when said outer race turns in the direction of engagement, said inner race turns freely when said outer race turns opposite the direction of engagement, said rear wheels receiving power from said drive shaft assembly through said drive shaft; and f) whereby when power is applied from said drive shaft to said rear driven wheel assembly, whichever rear wheel that is spinning the slowest receives the power.

11. A vehicle as recited in claim 10, wherein said inner race turns freely opposite the direction of engagement when said outer race is stationary.

12. A vehicle as recited in claim 10, wherein said drive shaft assembly further includes a power input shaft engaged with said drive shaft by a set of bevel gears.

13. A vehicle as recited in claim 12, wherein said drive shaft assembly further includes a chain operably engaged with said power input shaft for rotating said power input shaft.

14. A vehicle as recited in claim 13, wherein said drive shaft assembly further includes a peddle shaft having peddles, said peddle shaft operably engaged with said power input shaft, whereby application of force to said peddles causes said peddle shaft to rotate said power input shaft.

15. A vehicle as recited in claim 10, wherein said drive shaft assembly further includes multiple gears and a gear shifter.

16. A vehicle as recited in claim 10, wherein said drive shaft assembly further includes a motor for driving said drive shaft.

17. A vehicle as recited in claim 10, wherein said split axle is coupled to a second drive shaft.

18. A vehicle as recited in claim 10, further comprising a seat.

19. A drive system, comprising:

a) a drive shaft;

b) a driven wheel assembly having a split axle coupled perpendicular to said drive shaft, said split axle having two axle sections;

c) an overrunning clutch coupled between each axle section and said drive shaft;

d) a wheel coupled to spin with each axle section;

e) a power input shaft coupled at right angle to said drive shaft by a set of bevel gears, said power input shaft for providing power; and f) wherein the power from said power input shaft is transferred to whichever rear wheel spins the slowest.

20. A drive system as recited in claim 19, further comprising a chain operably engaged with said power input shaft for rotating said power input shaft.

21. A drive system as recited in claim 20, further comprising a peddle shaft having peddles, said peddle shaft operably engaged with said power input shaft, whereby application of force to said peddles causes said peddle shaft to rotate said power input shaft.

22. A drive system, comprising:

a) a drive shaft lying along a drive axis;

b) a driven wheel assembly having a split axle coupled perpendicular to said drive shaft, said split axle having two axle sections;

c) an overrunning clutch coupled between each axle section and said drive shaft;

d) a wheel coupled to spin with each axle section;

e) a power input shaft coupled to said drive shaft, said power input shaft for providing power;

f) a u-shaped element with u-ends that are each connected to support opposite ends of said drive shaft, said power input shaft rotates with said u-shaped element about said drive axis relative to said split axle; and g) wherein the power from said power input shaft is transferred to whichever rear wheel spins the slowest.

23. A vehicle, comprising:

a) a frame assembly defining a lean plane and having a lean axis;

b) a drive shaft assembly mounted to said frame assembly, said drive shaft assembly having a drive shaft lying along a drive axis, said frame assembly pivots around said lean axis, said lean axis and drive axis are co-linear;

c) a driven wheel assembly coupled to said frame assembly, said driven wheel assembly having a split axle coupled perpendicular to said drive shaft, said split axle having two axle sections with a wheel coupled to spin with each axle section; and e) an overrunning clutch coupled between each axle section and said drive shaft.

\* \* \* \* \*